United States Patent Office 3,400,994
Patented Sept. 10, 1968

3,400,994
TWO COMPONENT WIDE ANGLE CAMERA LENS
Mikhail Mikhailovich Roosinov and Petr Dmitrievich Ivanov, Leningrad, and Falk Solomonovich Novik, Moscow, U.S.S.R., assignors to Leningradsky Institute Tochnoi Mekhaniki i Optiki, Leningrad, U.S.S.R.
Filed Aug. 13, 1964, Ser. No. 389,494
1 Claim. (Cl. 350—215)

ABSTRACT OF THE DISCLOSURE

A wide angle camera lens constituted by first and second components arranged one ahead of the other on the optical axis. The first component has an angular magnification less than unity and comprises two negative meniscus lenses and two postive correction lenses, one of which is plano-convex and is positioned in front of the negative lenses, while the second mentioned positive lens is convexo-convex and is set behind the negative lenses. The second component is constituted by two cemented lens elements of which two are negative lenses and two are positive lenses set between the latter negative lenses and cemented to them. The lenses of both components have spherical surfaces.

---

This invention relates to wide angle photographic lenses, and in particular to wide angle camera lenses.

Wide angle camera lenses, made up of two components are well known. The first distortion corrected component with angular magnification was made as one or several negative lenses with deep aspherical surfaces. The second positive component is made up of concentric surface lenses, and is also distortion corrected.

The known two-component wide angle camera lenses are characterized by a relative aperture ratio not exceeding 1:3.5, a visual field $2\beta=90°$ and considerable vignetting.

This results in a substantial decreases of the illumination of the margins of the field. There are lenses with a field of vision 130° and an improved light distribution with aspherical surface elements (the outer cap has a deep elliptical surface). The manufacture of such lenses is complicated and expensive.

The main objective of the present invention is to provide a two component wide angle camera lens having spherical surfaces, with the first component comprised of not less than one positive correction lens with a plano or convex front surface placed as the front component of the optical system. Meniscus negative lenses (made of glass with Abbe number above 50) of the said component operate in the angle of minimum diffraction. This serves to correct distortion.

A significant feature of the invention is that the rear surface of the latter lens of the second component is nonconcentric over more than half of the radius of the latter lens, and the refraction indexes ($n$) of the said negative component lenses (made of glass with Abbe number below 35) are larger than the positive lens refraction indexes (made of glass with Abbe number above 40) by a value exceeding 0.05.

An object of this invention is to improve the distribution of light and quality of the image without employing lenses with aspherical surfaces; to ensure a high quality image on a film of large size (e.g. 70 mm.). Other objects and features of the invention will become apparent in the description that follows:

Several embodiments of this invention are given in the drawings wherein.

Figure 1:
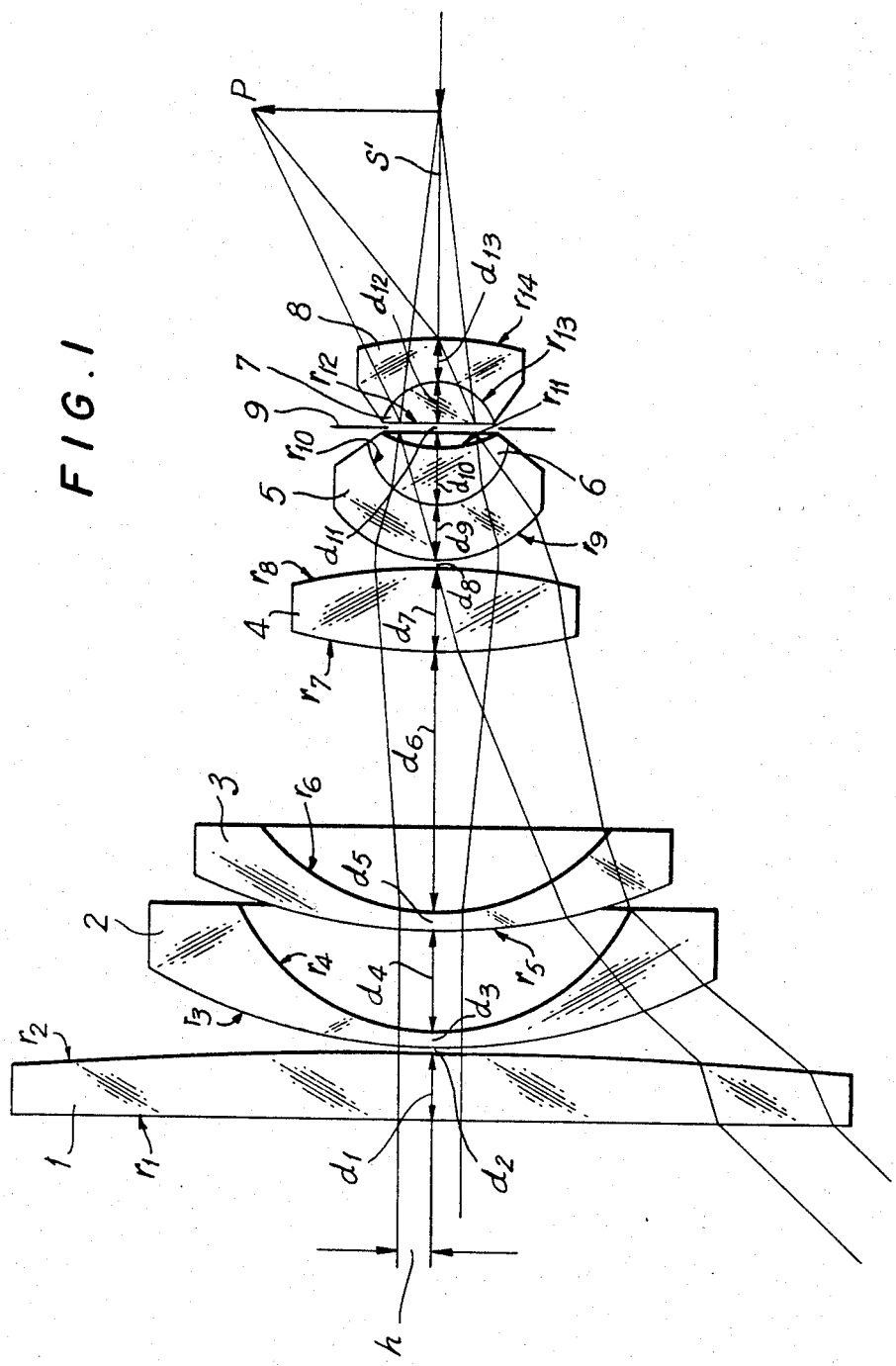
FIG. 1 is an optical diagram of a wide angle camera lens according to the invention.
Figure 3:
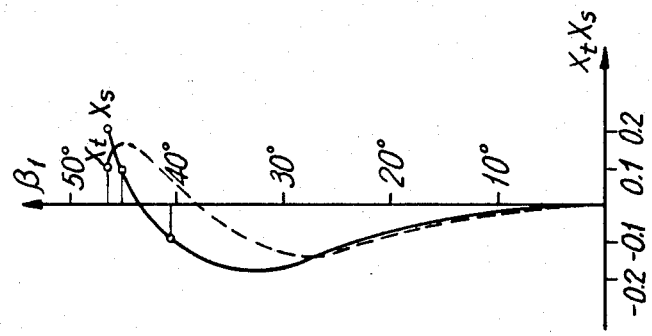
FIG. 3 is a diagram wherein astigmatism is related to the angle of the visual field.
Figure 2:
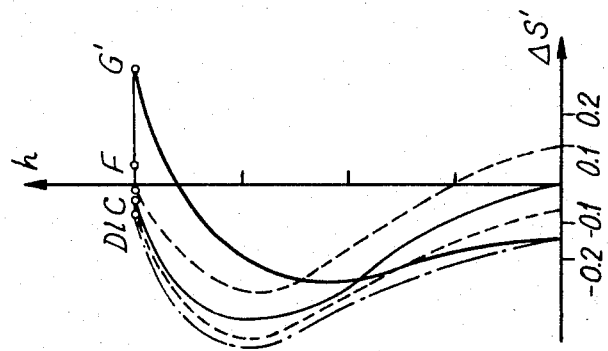
FIG. 2 is a diagram wherein spherical aberration is related to various spectrum wavelengths (from line C to G').
Figure 4:
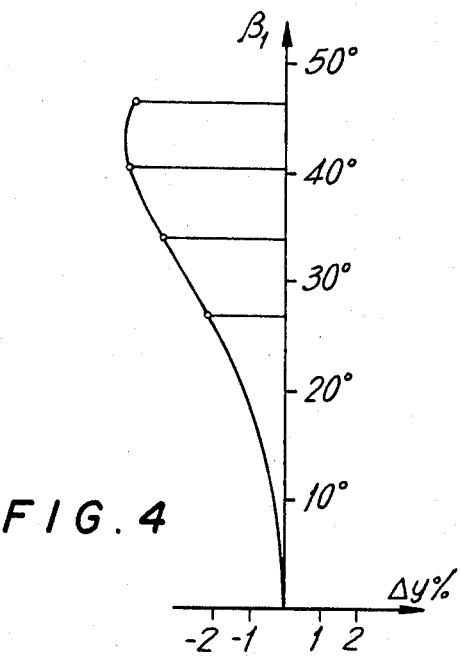
FIG. 4 is a diagram wherein distortion is related to the angle of the visual field.
Figure 5:
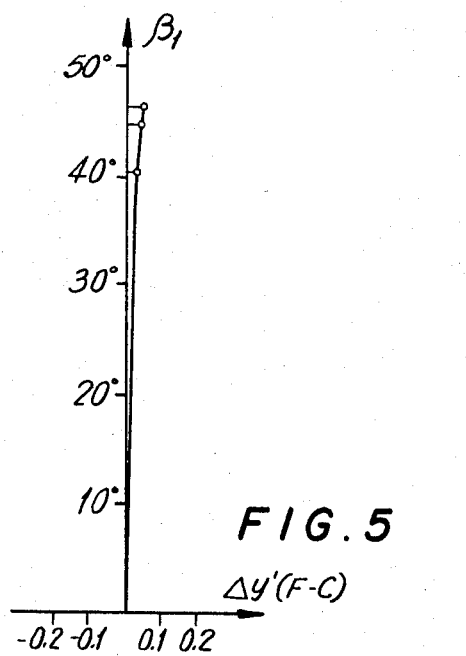
FIG. 5 is a diagram wherein chromatism is related to the angle of the visual field.
Figure 6A:
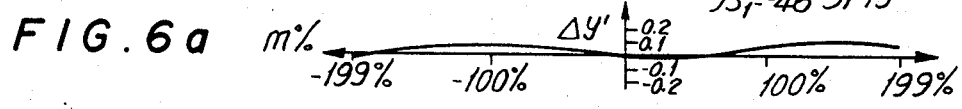
FIGS. 6a–6f are diagrams wherein lateral aberrations are related to the angle of the visual field and to the width $m_r\%$ of the inclined rays.
Figure 6B:
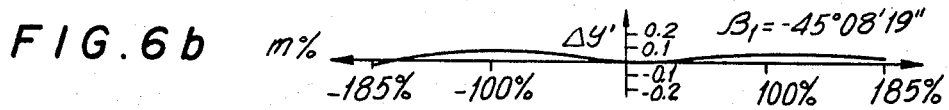
Figure 6C:
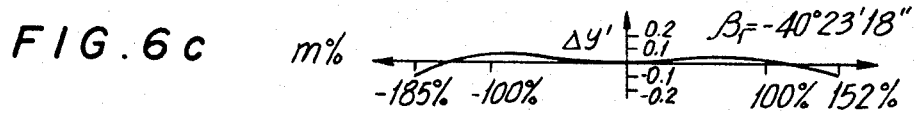
Figure 6D:
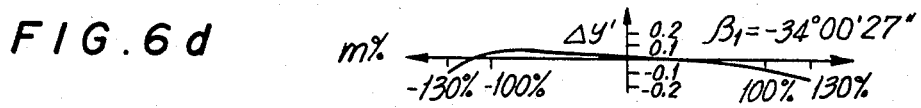
Figure 6E:
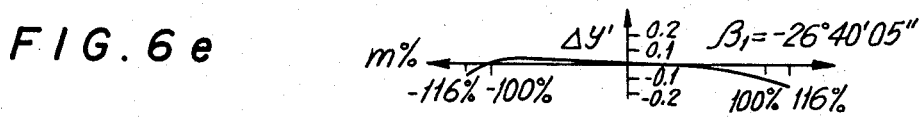
Figure 6F:
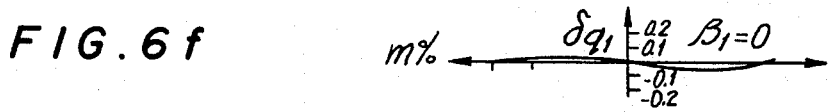

The wide angle camera lens illustrated in FIG. 1 consists of two components, each component consists of respective lenses 1, 2, 3, 4 and 5, 6, 7, 8. All the lens surfaces are spherical.

The first negative or telescopic component comprises two positive correction lenses 1 and 4, and two negative meniscus lenses 2 and 3 whose surfaces deflect the main rays to the same side and deflection degree. This corresponds to the functioning of said lenses in the minimum diffraction angle.

Lens 1 is plano-convex or meniscus shaped. Negative lenses 2 and 3 of the first component are made of glass with Abbe number exceeding 50.

If the distance between negative lenses 2 and 3 and positive lens 4 is equal to the focal length difference (in absolute value) of the first three lenses 1, 2, 3 and lens 4, then the first component changes from being a negative system into a telescopic one.

The second component comprises cemented pairs of lenses—5,6 and 7, 8. The surfaces of these lenses have radii of curvature $r_9$, $r_{10}$ and $r_{13}$, and these surfaces are concentric with diaphragm 9. The rear surface of lens 8 has a radius $r_{14}$ which is non-concentric with diaphragm 9 by a value exceeding half of the rear radius ($r_{14}$), e.g. the common center of the indicated concentric surfaces is closer to the top of the non-concentric surface rather than to its center.

The refraction index ($n$) of the second component negative lenses 5 and 8 exceeds the refraction indexes of the corresponding positive lenses 6 and 7 by a value exceeding 0.05.

Negative lenses 5 and 8 are made of glass of Abbe number less than 35, and positive lenses 6 and 7 are made of glass with Abbe number exceeding 40.

Diaphragm 9 is set between lenses 6 and 7.

Figure 7:
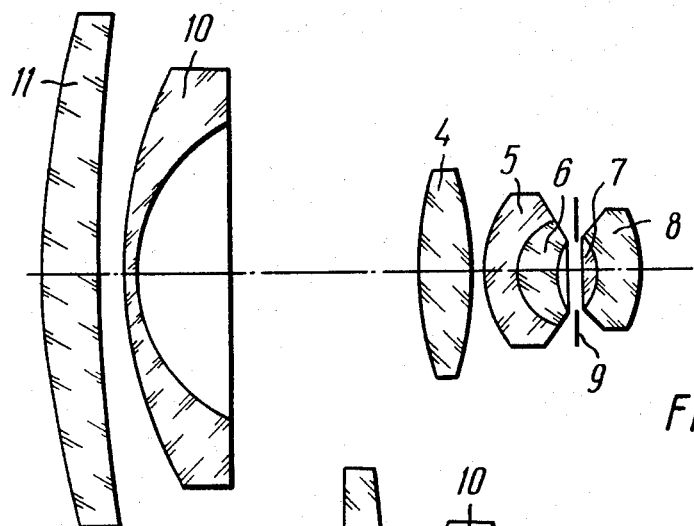
FIGS. 7–9 are diagrammatic lens arrangements of further embodiments of the invention.
Figure 8:
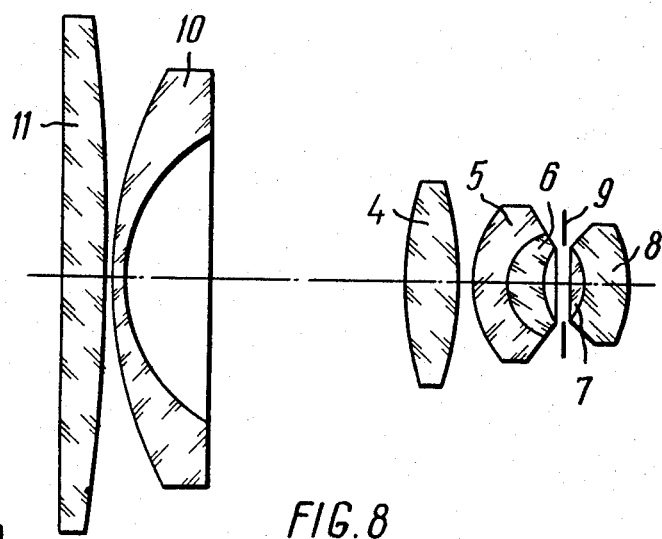
Figure 9:
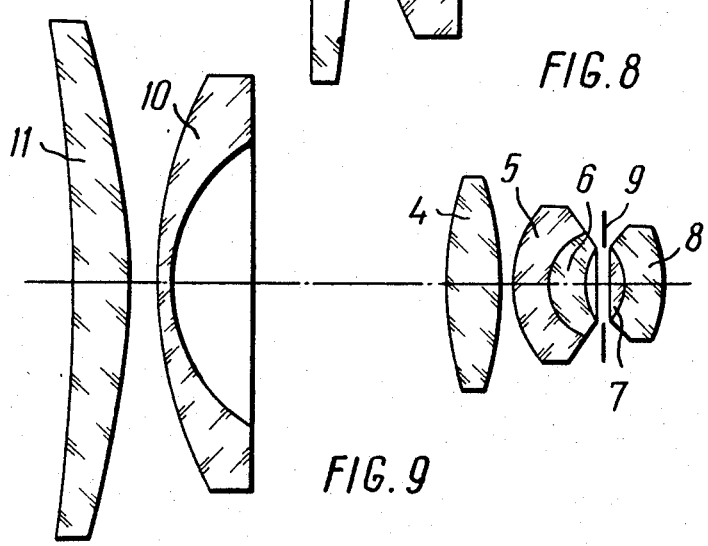

In the first component there may be also installed one negative meniscus lens 10, as shown in FIGS. 7, 8 and 9. Here first positive lens 11 is plano-convex or, as shown in FIGS. 7 and 9 the first positive lens 11 may be meniscus shaped.

A cemented composite lens is the second component, and it is formed with a rear surface for lens 8 (FIGS. 7 and 8) which is non-concentric with diaphragm 9 as described above, or the rear surface of the rear lens 8 (FIG. 8) is concentric with diaphragm 9.

If the rear surface of lens 8 is non-concentric, it allows an increase in the distance between the lens and the focal plane P. This permits the use of the described lens in combination with a reflex shutter.

For a better understanding of the invention the following example is given.

Example

A wide angle camera lens given by way of illustration for 70 mm. film size and 25×50 mm. film shutter, focal length $f'=27.88$, with a distance $S'=32.09$ from the rear surface of the lens to the focal plane P, relative aperture 1:3.5 and field of vision $2\beta=93°02'$; the illumination of the marginal zone of the visual field is 60% of the illumination in the center of the field.

Table 1 indicates the constructive elements of the described lens, where $d$ is lens interval, $\nu$ is Abbe number, and $n$ is refraction index.

TABLE 1

| No. | r | d | n | ν | Diameter Arrows | | | |
|---|---|---|---|---|---|---|---|---|
| | | | | | Light | Full | Light φ | Full φ |
| 1 | ∞ | 8 | 1.6126 | 58.3 | 113.3 | 117 | | |
| 2 | −743 | 0.68 | 1.0000 | | 107.28 | 117 | 1.94 | 2.10 |
| 3 | 74.3 | 2.7 | 1.6126 | 58.3 | 74.94 | 77.5 | 10.14 | 10.91 |
| 4 | 31.92 | 13.5 | 1.0000 | | 56.60 | 56.60 | 17.15 | 17.15 |
| 5 | 94.62 | 2.7 | 1.6126 | 58.3 | 55.92 | 58.5 | 4.22 | 4.62 |
| 6 | 32.43 | 38.65 | 1.0000 | | 47.50 | 47.6 | 10.34 | 10.40 |
| 7 | 135.21 | 9.75 | 1.6126 | 58.3 | 36.32 | 38.5 | 1.22 | 1.38 |
| 8 | −89.74 | 0.2 | 1.0000 | | 34.0 | 38.5 | 1.62 | 2.09 |
| 9 | 17.258 | 8.304 | 1.6123 | 27.3 | 26.94 | 28.5 | 6.47 | 7.52 |

TABLE 1—Continued

| No. | r | d | n | ν | Diameter Arrows | | | |
|---|---|---|---|---|---|---|---|---|
| | | | | | Light | Full | Light φ | Full φ |
| 10 | 8.954 | 8.10 | 1.6123 | 44.1 | 16.5 | 17.5 | 5.46 | 7.05 |
| 11 | 18.197 | 2.12 | 1.0000 | | 11.78 | 12 | 0.98 | 1.02 |
| 12 | 115.88 | 5.916 | 1.6123 | 44.1 | 11.52 | 11.8 | 0.14 | 0.15 |
| 13 | −8.79 | 6.6 | 1.7280 | 28.3 | 13.50 | 14.5 | 3.16 | 3.82 |
| 14 | −37.15 | | | | 20.56 | 22 | 1.45 | 1.67 |

Table 2 gives aberration values for a point on the lens axis.

Table 3 gives values of astigmatism, distortion and chromatic difference of magnification related to the angle of the visual field.

Table 4 gives lateral aberrations in inclined rays.

In Tables 2–4 the following designations are used: $h$—height of the lens; $S'$—the distance on the axis from the rear surface of the lens to the focal plane P; $\Delta S'$—value of aberration; $f'$—focal length; $\Delta f'$—focal length deviation; $\lambda$—length of wave; D, C, F—spectrum lines; $\beta_1$—entrance field angles; $\beta'$—angles of emergence; $s'_{1x}$—distance from the first surface to the center of the entrance pupil; $S^1_x$—distance from the rear surface to the center of the exit pupil; $x_t$—distance from meridional focus to focal plane P; $x_s$—distance from segittal focus plane P; $\Delta y'$—distortion; $\Delta y'\%$—relative distortion; $\Delta y'(F-C)$ is the chromatic difference of magnification; $m_I$ is the width of the inclined rays in metric length and percentages; $\delta G'$—is the circle of diffusion in the field center.

The results given in Tables 2–4 are shown graphically in FIGS. 2–6. This invention is applied in particular in cameras for shooting wide screen movie pictures on 70 mm. size film.

Though this invention is described according to a preferred embodiment, it is evident, that changes and variations may be made by those skilled in the art without departing from the invention.

These changes and versions are not considered to be beyond the main point extent of the invention and claims attached thereto.

TABLE 2

| h | D | | λ=589.3 | | Cλ=656.3 | | F | | ΔS' (F−C) | Cλ=546.1 | | G'λ=434 | |
|---|---|---|---|---|---|---|---|---|---|---|---|---|---|
| | S' | ΔS' | f' | Δf' | S' | ΔS' | S' | ΔS' | | S' | ΔS' | S' | ΔS' |
| 3.98 | 32.03 | −0.059 | 27.797 | −0.084 | 32.066 | −0.024 | 32.139 | 0.049 | 0.0729 | 32.038 | −0.052 | 32.393 | 0.303 |
| 2.79 | 31.698 | −0.392 | 27.614 | −0.267 | 31.785 | −0.305 | 31.648 | −0.443 | −0.137 | 31.656 | −0.434 | 31.744 | −0.346 |
| 0 | 32.08 | | 27.88 | | 32.209 | 0.118 | 31.943 | −0.147 | −0.265 | 32.017 | −0.074 | 31.943 | −0.143 |

TABLE 3

| $\beta_1$ | $s'_{1x}$ | $\beta'$ | $S_x^I$ | $x_t$ | $x_s$ | $x_t-x_s$ | $\Delta y'$ | $\Delta y'\%$ | $\Delta y'(F-C)$ |
|---|---|---|---|---|---|---|---|---|---|
| −46°31'15" | 46.267 | −34°02'23" | −9.56 | 0.086 | 0.196 | 0.11 | −1.259 | −4.28 | 0.0475 |
| −45°08'19" | 45.555 | −38°41" | −9.58 | 0.147 | 0.0797 | 0.068 | −1.268 | −4.53 | 0.0419 |
| −40°23'18" | 44.201 | −28°30'45" | −9.64 | 0.054 | −0.119 | 0.1736 | −1.049 | −4.42 | 0.0288 |
| −34°00'27" | 43.513 | −23°28'30" | −9.71 | −0.105 | −0.183 | 0.078 | −0.657 | −3.49 | 0.0188 |
| −26°40'05" | 43.293 | −18°06'00" | −9.78 | −0.149 | −0.151 | 0.002 | −0.317 | −2.26 | 0.0188 |

TABLE 4

$\beta_1 = 46°31'15''$

| $M_I$ mm. | $M_I$ Percent | $\beta_1$ | $y'$ | $\Delta y'$ | Coma |
|---|---|---|---|---|---|
| 7.9 | 199 | −28°07′33″ | 28.21 | | |
| 3.98 | 100 | −31°00′55″ | 28.197 | 0.073 | 0.0296 |
| 0 | 0 | −34°02′23″ | 28.14 | 0.059 | 0.063 |
| −3.98 | 100 | −37°11′15″ | 28.21 | 0.067 | 0.063 |
| −7.9 | 199 | −40°25′59″ | 28.12 | −0.13 | 0.0296 |

$\beta_1 = 45°08'19''$

| 7.37 | 185 | 29°34′12″ | 26.77 | | |
|---|---|---|---|---|---|
| 3.98 | 100 | −29°21′30″ | 26.80 | 0.027 | −0.025 |
| 0 | 0 | −32°41′43″ | 26.74 | 0.054 | 0.057 |
| −39.8 | 100 | −36°17′11″ | 26.81 | 0.06 | 0.057 |
| 7.37 | 185 | −39°15′20″ | 26.67 | −0.047 | −0.025 |

$\beta_1 = 40°23'18''$

| 6.1 | 152 | −21°5′37″ | 22.59 | | |
|---|---|---|---|---|---|
| 3.98 | 100 | −24°10′52″ | 22.68 | −0.082 | −0.099 |
| 0 | 0 | −28°30′45″ | 22.67 | 0.006 | 0.032 |
| −3.98 | 100 | 33°07′12″ | 22.73 | 0.059 | 0.039 |
| −6.1 | 152 | 35°25′18″ | 22.55 | −0.115 | −0.099 |

$\beta_1 = 34°00'27''$

| 5.18 | 130 | −16°18′58″ | 18.01 | | |
|---|---|---|---|---|---|
| 3.98 | 100 | −17°59′39″ | 18.09 | −0.143 | −0.124 |
| 0 | 0 | −23°28′30″ | 18.15 | −0.064 | −0.006 |
| −3.98 | 100 | −29°11′17″ | 18.21 | 0.051 | 0.006 |
| 5.18 | 130 | −30°46′24″ | 18.05 | −0.104 | −0.184 |

$\beta_1 = 26°40'05''$

| 4.6 | 116 | −10°26′58″ | 13.54 | | |
|---|---|---|---|---|---|
| 3.98 | 100 | −11°32′31″ | 13.59 | −0.148 | −0.121 |
| 0 | 0 | 18°06′09″ | 13.69 | −0.108 | −0.042 |
| −3.98 | 100 | −24°48′06″ | 13.64 | 0.024 | −0.042 |
| −4.6 | 116 | −25°47′18″ | 13.57 | −0.094 | −0.121 |

$\beta_1 = 0$

| 3.98 | 100 | | | −0.0086 | |
|---|---|---|---|---|---|
| 2.79 | 70 | | | −0.0398 | |

What we claim is:

1. A two component wide angle camera lens which is distortion corrected, said lens comprising a first component with angular magnification less than unity including two negative meniscus lenses and two positive correction lenses, one of said positive correction lenses being plano-convex and set in front of the said negative lenses, the second mentioned positive lens being convexo-convex and set behind the said negative lenses; the second component being constituted by two cemented lens elements consisting of two negative lenses, and two positive lenses set between said negative lenses of the second component and cemented thereto, said lenses of the both components having spherical surfaces; the constructive features and position of the lenses being given in the following table wherein, $r$ is the radii of curvature of the lens surfaces; $d$ is the lens interval; $n$ is the refraction index; and $\nu$ is Abbé number.

| No. | $r$ | $d$ | $n$ | $\nu$ |
|---|---|---|---|---|
| 1 | −743 | 8 | 1.6126 | 58.3 |
| 2 | 74.3 | 0.68 | 1.0000 | |
| 3 | 31.92 | 2.7 | 1.6126 | 58.3 |
| 4 | 94.62 | 13.5 | 1.0000 | |
| 5 | 32.43 | 2.7 | 1.6126 | 58.3 |
| 6 | 135.21 | 38.65 | 1.0000 | |
| 7 | −89.74 | 9.75 | 1.6126 | 58.3 |
| 8 | 17.258 | 0.02 | 1.0000 | |
| 9 | 8.954 | 8.304 | 1.7280 | 27.3 |
| 10 | 18.197 | 8.10 | 1.6123 | 44.1 |
| 11 | 115.88 | 2.12 | 1.0000 | |
| 12 | −8.79 | 5.916 | 1.6123 | 44.1 |
| 13 | −37.15 | 6.6 | 1.7280 | 28.3 |
| 14 | | | | |

References Cited

UNITED STATES PATENTS 3,295,913  1/1967  Walther _____ 350—177

FOREIGN PATENTS 1,358,080  3/1964  France.
213,097  1/1961  Austria.

JOHN K. CORBIN, *Primary Examiner.*